Patented May 2, 1967

3,317,470
CRYSTALLINE DIGLYCIDYL ETHER OF BIS-PHENOL A WITH CURING AGENTS

Kenneth B. Cofer, Pasadena, Tex., assignor to Shell Oil Company, New York, N.Y., a corporation of New York
No Drawing. Original application Aug. 11, 1960, Ser. No. 48,855. Divided and this application Apr. 1, 1965, Ser. No. 458,608
5 Claims. (Cl. 260—47)

This application is a division of application Serial No. 48,855, filed August 11, 1960, now abandoned.

This invention relates to novel resinifiable compositions containing free-flowing crystals of 2,2-bis(2,3-epoxypropoxyphenyl)propane and solid curing agents, their preparation and their use in preparing epoxy resins.

The novel compositions are particularly useful as adhesives and will be discussed especially with respect to such use. The compositions are, however, adapted to be used also in the prepartion of moldings, surface coatings, pottings and other uses to which epoxy resins are conventionally put.

The use of various combinations of epoxy resins and curing agents as adhesives for bonding metals, wood, glass and many other types of surfaces is well known. The epoxy resins which are most widely used for this purpose are the reaction products of 2,2-bis(4-hydroxyphenyl)propane (known as p,p'-bisphenol A) and epichlorohydrin. These products are normally liquid or normally solid materials, depending on the ratio of reactants and the reaction conditions employed in their preparation.

The use as adhesives of the conventional epoxy compounds whether liquid or solid, entails certain disadvantages which are overcome by the compositions of this invention.

When a liquid epoxy resin is used as an adhesive with a quick-acting curing agent it is necessary to mix the curing agent with the resin at most a short time before use because the mixture begins to cure after it is prepared. The time interval during which the mixture remains in liquid, usable condition, the so-called pot life, is relatively short for such a mixture. If a longer pot life is needed or if a one-package system is desired in which the curing agent has been premixed by the adhesive manufacturer, then to achieve the necessary package stability a very sluggish curing agent must be used. This in turn necessitates a long cure at a high temperature, e.g., two hours at 350° F.

When a normally solid epoxy compound is used in an adhesive composition it is generally necessary that it be converted to a liquid before being applied. This requires heating of the solid epoxide, generally to a temperature at which curing proceeds so rapidly that only the aforementioned sluggish curing agents can be used. The solid epoxy resins have the further disadvantage of a lower epoxide content which gives a less highly crosslinked structure with resultant loss in strength and chemical resistance.

It has also been found that the conventionally used polyepoxy compounds, whether liquids or solids, have undesirably high viscosities at the temperatures at which they are preferably applied. It was, therefore, necessary to devise various special diluents which are used with these compounds in order to reduce the viscosities to desirable levels. Diluents for this use must meet special requirements because there is no possibility for inert materials to evaporate when the mixture is used as an adhesive and consequently the diluent must in some manner interreact with the adhesive composition.

It is an object of this invention to provide a particulate composition comprising an epoxy resin and a curing agent which composition is solid at temperatures below about 100° F. and is easily converted to a liquid of relatively low viscosity at temperatures above about 110° F. Another object is to provide such a composition which remains, after being melted, a liquid with a moderately long pot life, suitable for use as an adhesive. It is an object of this invention to provide a solid composite comprising a diepoxide and a curing agent which is characterized by a very long shelf life in its solid state and ability to cure quickly at curing temperatures. Other objects of this invention will appear from the following description thereof.

It has been found that these and other objects of this invention can be accomplished by providing compositions comprising essentially a mixture of free-flowing crystals of 2,2-bis(2,3-epoxypropoxyphenyl)propane (the diglycidyl ether of p,p.-bisphenol A) and a curing amount of a stable curing agent therefor which is a solid at 100° F.

The compositions of this invention are particularly useful as adhesives. The preferred compositions are characterized by excellent shelf life. Very mild heating, in most cases heating to between 110° and 120° F. or slightly higher, converts the solid mixtures to liquids. Those compositions comprising heat activated curing agents subsequently remain liquid even when cooled to a much lower temperature and have a pot life of up to three days. The preferred compositions cure rapidly at curing temperatures; these are generally elevated temperatures of at least about 200° F. A further advantage of the compositions of this invention is that they have a high epoxide content relative to other epoxy adhesives and they are, therefore, adapted to yield exceptionally strong bonds which retain their strength at high temperatures.

A substantial practical advantage of the compositions of this invention is that they provide a practical means for furnishing a correctly proportioned mixture of polyepoxide and curing agent which only requires heating to convert it into usable form. This avoids the possibility of proportioning errors in the manufacturing operation which are likely to occur when polyepoxide and curing agent must be mixed at the side of application.

COMPONENTS USED IN THE NOVEL COMPOSITIONS

The epoxide

The reaction of epichlorohydrin with 2,2-bis(4-hydroxyphenyl)propane to produce a complex mixture of polyglycidyl ethers is well-known. It is described in some detail, for example, in U.S. 2,467,171 to Werner et al., and in U.S. 2,651,589 to Shokal et al. The simplest addition product which is formed in this reaction is the 2:1 addition, 2,2-bis(2,3-epoxypropoxyphenyl)propane which is represented by the formula

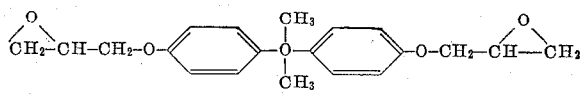

The higher molecular addition products which are also formed in the reaction have the general formula

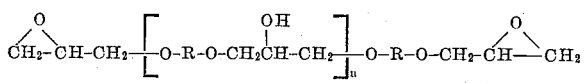

wherein $n$ is an integer and R represents the divalent hydrocarbon radical of the bisphenol. By appropriate control of the ratio of epichlorohydrin to bisphenol in the reaction and of other reaction conditions, complex mixtures can be produced which contain a relatively high proportion of the diglycidyl ether, e.g., 70%–90% by weight or more of the total reaction product, the remainder being mainly higher addition products. Similarly, solid polyepoxy polyethers of higher molecular weight can be prepared by appropriate control of ratios and reaction conditions.

It has been found that by careful preparation of a concentrate containing a relatively high proportion of the diglycidyl ether and by careful crystallization of the diglycidyl ether from a suitable solvent mixture it is possible to recover the diglycidyl ether, 2,2-bis(2,3-epoxypropoxyphenyl)propane, in the form of free-flowing crystals of substantially 100% purity. Following are representative properites of the crystalline compound prepared in this manner, compared with such properties for a typical commercial liquid polyepoxide containing about 80% of the diglycidyl ether and for two typical commercial polyglycidyl ethers of the same type which are normally solids.

interreact with crystalline 2,2-bis(2,3-epoxypropoxyphenyl)propane in such a way that the solid mixture gradually, and spontaneously, liquefies and then begins to cure at a relatively rapid rate. It appears that this spontaneous reaction takes place with curing agents whose vapor pressure is relatively high at ambient temperatures. These are, in general, compounds with relatively low melting points, e.g., below 200° F. The effect has sometimes been observed, for example, with metaphenylenediamine (M.P. 140° F.), methylenedianiline (M.P. 185° F.) and with hexahydrophthalic (M.P. 95–97° F.). Similarly, solid complexes of $BF_3$ which have a relatively high vapor pressure of $BF_3$ associated with the complex at ambient temperatures may result in liquefaction of the mixture. Mixtures prepared with such curing agents are nevertheless useful, e.g., where it is convenient to store the mixture under refrigerated conditions or where

TABLE 1

|  | Crystalline Diglycidyl Ether | Liquid Polyglycidyl Ether | Solid Polyglycidyl Ethers | |
|---|---|---|---|---|
| Weight per Epoxide | 170 | 193 | 500 | 970 |
| Melting Point, °F | a 110.3 | | | |
| Softening Point,b °F | | | 158 | 208 |
| Molecular Weight | 340 | | 900 | 1,400 |
| Total Chlorine, Percent Weight | 0.03 | 0.28 | | |
| Saponifiable Chlorine, Percent Weight | <0.01 | 0.12 | | |
| Color, Gardner | <1 | 3 | | |
| Viscosity, Poises at 25° C | c 40 | 167 | | | a Sharp melting point, typical of pure compound.
b Durrans' mercury method.
c Supercooled liquid.

The melting point of the crystalline diglycidyl ether may vary slightly in batches of different purity. It is in the range between 105° and 113° F. It is a distinct, clear melting point in contrast to the softening points exhibited by the solid polyglycidyl ethers of higher molecular weight.

It may sometimes be desirable to admix a conventionl solid polyepoxide with the crystalline diglycidyl ether of p,p'-bisphenol A in preparing the powdered composite of this invention. In such admixtures up to 25 parts of conventional solid polyepoxide to 100 parts of crystalline diglycidyl ether of p,p'-bisphenol A may be employed. The solid polyepoxide may be, for example, that mentioned in U.S. 2,633,458 to Shokal as "Polyether E," having a Durrans melting point of 98° C. and molecular weight of 1400, or that having a softening point of 131° C. and a molecular weight of 2900, or other similar normally solid polyepoxides. In general, superior results are obtained from composites containing the diglycidyl ether of p,p'-bisphenol A as the sole epoxide component.

*Curing agents*

As essential requirement of all curing agents suitable for use in this invention is that they be solids at ambient temperatures, i.e. up to about 100° F. Their melting points should preferably be above 110° F. In the following discussions of curing agents the requirement that they be solids at ambient temperature is not always repeated but will be understood.

Not all solid curing agents are equally useful. In general it is desirable that the curing agent be relatively fast acting once the mixture of resin and curing agent has been melted and heated to a curing temperature. The rate at which they act is known for most curing agents or can be readily determined.

It has also been found that some solid curing agents the advantages of convenient mixing of solids are desired and the mixtures are to be used without extended storage.

Amines represent a large group of conventional curing agents for epoxy resins. Most, however, are normally liquid and thus not useful in this invention. Others, though solid, tend to interreact and cause fusion of the mixtures, as has been described above and may be used where this characteristic is not objectionable. Higher melting solid polyamines, however, e.g., diaminodiphenylsulfone, triaminotriphenylmethane, and 9,9-bis-(3-aminopropyl)fluorene can be used to advantage in this invention.

*Fillers*

A variety of inert solid compounds are known to be useful as so-called fillers in epoxy resin compositions. These compounds are added to provide various desired characteristics, e.g. an increase in density or a different appearance of the finished resin or alteration of the rheological characteristics of the adhesive in the paste form. Conventional solid fillers are suitably applied in the compositions according to this invention. They include, for example, powdered metals such as aluminum powder, and other finely divided materials such as asbestos, various clays, and the like.

*Modifiers*

It is common practice in the industry to add minor amounts of various thermoplastic resins to epoxy resin compositions to decrease their brittleness. Such materials are suitably added to the composition according to this invention. They include, for example, polyvinylformal, polyvinylchloride, polyvinylacetate, and polyacrylamide.

Other conventional modifiers of epoxy resins may be used if they are solid at ambient temperatures.

PROPORTIONS OF INGREDIENTS

In referring to the amount of an ingredient of a resin composition, the conventional measurement is in parts by weight per 100 parts of resin, abbreviated "phr." In the following, phr. refers to parts by weight per 100 parts of 2,2-bis(2,3-epoxypropoxyphenyl)propane.

Solid polyepoxypolyethers may be admixed in concentrations up to 25 phr. They are preferably omitted altogether or used in low concentrations, e.g. up to 10 phr.

The proportions of various curing agents required to cure a polyepoxide are known to the art and can be found in text books and industrial publications. Thus, "a curing amount of a curing agent" has a definite meaning to the worker skilled in this art. Following is a brief résumé:

Acid anhydride and primary amine curing agents are preferably employed in approximately stoichiometrically equivalent proportion. As used herein in relation to the amount of curing agent and polyepoxide, the expression "equivalent amount" refers to that amount of anhydride needed to furnish one anhydride group for every epoxy group in the polyepoxide to be cured or that amount of amine needed to furnish one active hydrogen per epoxide group. A cure can be obtained with as little as 0.62 equivalent of an amine, as illustrated in Example 18. In general, satisfactory cures are obtained by using at least 0.8 equivalent of the anhydride or amine, but for best results such curing agent should be employed in approximately the equivalent amount. Curing agent to epoxide equivalent ratios of 0.85:1 to 1.15:1 are suitably employed. The selection of proper ratios of curing agents is well known to persons skilled in this art. It is, for example, discussed in "Epoxy Resins" by Lee and Neville, McGraw-Hill Book Company, 1957, on pages 51 and 52, and throughout the sections of said book which deal with curing agents.

$BF_3$ complexes or complexes of other Lewis acids, when used as curing agents, are employed in much lower concentrations; amounts in the range from 0.1 to 15 phr. are suitable, and the range from 1 to 10 phr. is especially preferred.

The amount of filler which can be employed is a function of the physical properties of the filler and of the desired characteristics of the finished products. Thus, finely divided aluminum dust can be employed in concentrations as high as 200 phr. Its use in concentrations of up to 100 phr. is particularly preferred. Other fillers are generally used in much lower concentration, e.g. in the range from 10 to 50 phr., because of their lower density. For example, asbestos dust may be suitably employed in concentrations up to 40 phr. When fillers are employed, the amount usually exceeds 10 phr.

Thermoplastic resins, added to decrease brittleness are useful in the concentration range of 1 to 100 phr., and are preferably used in concentrations from 10 to 50 phr.

METHODS OF PREPARING BLENDS

It has been found that conventional methods are not generally suitable for preparing the compositions of this invention. In order to prepare a useful free-flowing solid composition it is essential that the crystalline diglycidyl ether be at no stage permitted to become liquefied. It is, however, necessary that the mixtures of the crystalline diglycidyl ether and such curing agents, promoters, fillers and modifiers as are employed be intimate blends of the ingredients, in order that a resin mixture of uniform composition be formed. Conventional grinding of the dry ingredients usually results in liquefaction of the mixture and does not produce a useful composite.

It has been found that desired blends can be prepared by suspending the ingredients to be blended in a volatile liquid in which the ingredients of the mixture are insoluble, e.g. in isopentane, heptane, isooctane, or other volatile naphtha type liquids, and mixing the ingredients in suspension in such liquid in a device such as a ball mill, a vibrating ball mill or a roll mill. After the mixture has been prepared the solvent may be removed by filtering or decanting and the remaining solvent removed by evaporation to produce a dry blend.

Dry blending methods in which no pressure is applied to the mixed components may be employed, e.g., the various components may be mixed in a fluidized solids system.

METHODS OF APPLICATION

A typical composition according to the present invention is a free-flowing powder which melts between 100° and 120°F. The melt does not resolidify when cooled to room temperature. The powder has a shelf life of at least six months when stored between 32° and 40°F. when the curing agent is of the heat activated type. When stored at ambient temperature there is a slow interreaction between the polyepoxide and curing agent, resulting in a gradual increase of the viscosity of the composition when melted.

The powder composites of the invention are particularly suitable for use as adhesives. They can be used to cause adhesion between a wide variety of different materials. It is well known to the art what materials can be bonded by polyepoxide adhesives. Typical bondable materials are metals, such as aluminum, beryllium, brass, copper, iron, steel, titanium and others; inorganic non-metals such as masonry materials and glass; and organic solids such as thermoset polymers and rubbers. In general the surfaces of the materials to be held together by the adhesive are cleaned in a well known manner. Certain organic materials, particularly thermoplastics, require special surface treatments which are known to the art.

The powder composite, when it is to be used as an adhesive, may be applied, for example, in the following two ways:

(1) As an even layer of powder, which may be followed by heating to sinter the mixture sufficiently to hold it in place. The physical method of applying the adhesive powder to a material to be bonded provides no special problems. The material may be applied manually, or conventional powder handling equipment may be employed. It is only necessary to avoid heating the powder at any point above a temperature of about 100°F. to avoid causing it to liquefy.

(2) By melting the composite in a separate container by mild heating and applying a thin even layer of the resulting paste.

The parts are then assembled and held together with clamps or by other means. The composites of this invention generally require curing temperatures of about 200° F. or higher. Typical conditions are from ½ to 3 hours at 250° F., from ¼ to 1 hour at 300° F. and from 2 to 30 minutes at up to 500° F.

In any particular instance a suitable curing time and temperature can be determined by a brief study of the effect these conditions have on the tensile strength of the bond between particular materials to be bonded. In general, as the curing time at a given temperature is increased a maximum bond strength is obtained at some particular time within the above stated ranges. The use of higher temperatures results in decreasing the amount of time required to obtain the strongest bond.

EXAMPLES

The invention will be illustrated by means of the following examples. It will be understood that these examples are for the purpose of illustration only and the invention is not to be limited thereby but only by the appended claims. Unless otherwise indicated, parts are parts by weight.

EXAMPLE 1

A composite was prepared having the following composition:

| Component: | Parts |
|---|---|
| Crystalline 2,2-bis(2,3-epoxpropoxyphenyl) propane | 100 |
| Trimellitic anhydride | 55 |
| Dicyandiamide | 0.5 |
| Asbestos floats | 40 |

In preparing the composite, the weighed dry ingredients were placed into a vessel and a sufficient amount of isoctane added to give a suspension which had the appearance of a stiff, grainy paste. This paste was then passed through a three roll paint mill several times, care being taken to avoid build-up of frictional heat to a level at which all of the solvent would have been removed by vaporization. The paste was then spread out to dry at room temperature and the resulting dry free-flowing powder placed in a container and stored in a cool place.

Equally good mixing was obtained by use of a two roll plastic mill in place of the paint mill.

Example 2

Composites were prepared having the same formulation as the composite of Example 1 but employing somewhat different mixing techniques. The weighed dried ingredients were placed into suitable containers and sufficient isopentene added to make a suspension which had the appearance of a fluid grainy paste. Steel balls were then placed into the containers and the containers tightly closed and agitated, such as by rolling on a bottle roller or shaking in a paint shaker, until good blending had been obatined. Several hours on the bottle roller or 5 to 15 minutes in a paint shaker were sufficient. The pastes were removed from the containers, spread out in a thin layer and dried at ambient temperature. The resulting dry, free-flowing powders were stored in a cool place.

Example 3

The procedures of Examples 1 and 2 are repeated, substituting each of the following liquids for the isooctane and isopentane, respectively: V.M. and P-naphtha (an aliphatic naphtha boiling in the $C_8$–$C_9$ range and containing about 15% aromatics); a highly aliphatic naphtha consisting largely of the heptane cut; an aliphatic naphtha consisting largely of the hexane cut; and a white gasoline. The use of each of these liquids results in a satisfactory operation. It is preferred, however, to use the slightly higher boiling materials, e.g., the $C_8$ or $C_9$ out or the gasoline in the method of Example 1 and the lower boiling, such as isopentane, hexanes or heptanes, in the method of Example 2.

Example 4

A portion of the powdered composite prepared according to Example 1 is heated to about 120° F. The powder melts, resulting in a moderately thick paste of uniform composition. This paste is sufficiently thixotropic so that it can be applied to a vertical surface without running, even during cure at elevated temperature. The paste is relatively viscous at room temperature. It is still a useful adhesive after storage for two to three days at 80° F. or storage of about 1 day at 120° F.

Portions of the paste are heated to a temperature in the range between 110° and 130° F. and used to bond together two sheets of etched aluminum, utilizing a variety of curing temperatures and times. The sample sheets of aluminum are bonded by spreading adhesive over about a ¾-inch width along an edge of each sheet and then placing the two sheets together with a ½-inch overlap, clamping them together and placing the assembly in a preheated oven provided with forced air circulation for the desired length of time. The sheets are sawed into strips in which the area of overlap is normally about ½ x 1 inch. The strips are then tested in tension at the desired test temperature at a loading rate of 1400 p.s.i. per minute.

The following table represents typical results of this test.

TABLE 2

| Cure Cycle | Tensile Shear Strength, p.s.i. | Test Temperature, °F. |
|---|---|---|
| 2 hrs. at 200° F | 1,850 | 75 |
| 4 hrs. at 200° F | 2,200 | 75 |
| 1 hr. at 250° F | 2,450 | 75 |
| 3 hrs. at 250° F | 2,600 | 75 |
| 1 hr. at 300° F | 2,800 | 75 |
| 2 min. at 400° F | 2,750 | 75 |
| 8 min. at 400° F | 2,540 | 75 |
| 4 min. at 500° F | 2,100 | 75 |
| ½ hr. at 250° F | 3,600 | 200 |
| 2 hrs. at 250° F | 3,700 | 200 |
| ¼ hr. at 300° F | 3,700 | 200 |
| 1 hr. at 300° F | 2,900 | 200 |
| ¼ hr. at 350° F | 4,000 | 200 |
| 1 hr. at 300° F | 4,200 | 300 |
| ¼ hr. at 400° F | 3,100 | 400 |

Example 5

The procedure of Example 4 is repeated with solvent wiped steel substituted for the aluminum sheet. The tensile shear strengths obtained are approximately 10% lower than the values found with aluminum in Example 4.

Samples of brass sheet, copper sheet and titanium sheet are similarly satisfactorily bonded by the adhesives of Examples 1, 2 and 3.

Satisfactory bonds are also obtained with the composites of Examples 1, 2 and 3 between brick, concrete, glass, polystyrene, phenol formaldehyde plastics, rubber, wood and paper.

Satisfactory composites are prepared by bonding sheets of fibrous materials such as fiber glass with the composites of these examples in the same manner in which such compositions are prepared from other polyepoxide resins.

Example 6

A composite is prepared similar to Example 1, utilizing a crystalline 2,2 - bis(2,3 - epoxypropoxyphenyl)propane having an equivalent weight of 173 per epoxy group. Varying the amount of trimellitic anhydride from 55 to 65 phr. and utilizing a fixed curing cycle results in a systematic variation of the tensile strength of the resulting bond through a range of 20%, the maximum being obtained at about 62 phr. of trimellitic anhydride.

Varying the amount of dicyandiamide accelerator in the composition having 60° phr. of the trimellitic anhydride results in about 17% variation in tensile strength, the strength of the bond decreasing as the amount of accelerator is increased.

Example 7

Compositions are prepared according to Examples, 1, 2 and 3 but substituting pyromellitic dianhydride in stoichiometric quantity for the trimellitic anhydride. The resulting powder composite is used as an adhesive in accordance with Examples 4 and 5. Satisfactory bonds are obtained.

Example 8

Composites are prepared according to Examples 1–3 but substituting for the trimellitic anhydride the solid complex of boron trifluoride with aniline. This complex is not employed in stoichiometric quantity but rather in a concentration of about 1.5 phr. The resulting composite has a long shelf life as a solid mixture but, once melted, has a pot life of only a few hours and should therefore be used rather promptly. When employed as an adhesive, it gives satisfactory bonds when cured at temperatures as low as 120° F.

Example 9

Composites are prepared in the manner of Examples 1–3 but substituting for trimellitic anhydride a stoichiometric quantity of diaminodiphenyl sulfone. The resulting powder composite is employed as adhesive in accordance with Examples 4 and 5. It is found that satisfactory bonds can be obtained, but the length of time required for cure is greater than with the trimellitic anhydride.

Example 10

Composites are prepared according to Examples 1–3 but substituting for the trimellitic anhydride a stoichiometric quantity of triaminotriphenyl methane. Satisfactory powder blends are obtained which are employed as adhesives according to the method of Examples 4 and 5. Satisfactory bonding of the surfaces is obtained.

Example 11

In Examples 1 to 3, 0.1 phr. and 1 phr., respectively, of benzyl dimethylamine are substituted for the dicyandiamide. The resulting composites are employed as adhesives with satisfactory results.

Example 12

In Examples 1 to 3, 0.1 phr., respectively, of benzyl dimethylamine are substituted for the dicyandiamide. The resulting composites are employed as adhesives with satisfactory results.

Example 13

For the asbestos floats of Examples 1 to 3 there are substituted a similar amount of each of the following fillers: silica, finely-divided aluminum, calcium carbonate, Wollastonite, mica, titanium dioxide and carbon black. Satisfactory adhesion is obtained with each of the resulting composites.

Example 14

The formulation of Example 1 is modified by adding 15 to 30 phr., respectively, of polyvinylformal. Upon melting prior to application, the resulting liquid phase is tackier and upon cure the resulting bond has improved flexibility.

Example 15

Polyvinylchloride is substituted for the polyvinylformal in Example 14 with similar results of improved tack and flexibility.

Example 16

A partially hydrolyzed polyvinyl acetate is substituted for the polyvinylformal of Example 14 with similar results of improved tack and flexibility.

Example 17

A polyacrylamide is substituted for the polyvinylformal of Example 14 with similar results of improved tack and flexibility.

Example 18

A composite is prepared by careful dry mixing, without grinding, of ten parts of crystalline 2,2-bis(2,3-epoxypropoxyphenyl)propane with one part of metaphenylenediamine. Within an hour of preparing the mixture, a portion thereof is heated to 120° to 165° F. The powder melts and cures to a typical cured polyepoxide resin.

Example 19

A composite is prepared according to Example 18, employing about four parts of 9,9-bis(3-aminopropyl)fluorene in place of metaphenylenediamine. The blend has a storage life of at least several days at 75° F. A portion of the blend is heated to about 140° F. The blend melts and cures within 24 hours at about 70° F. An elevated temperature is not required for satisfactory cure.

I claim as my invention:

1. A solid, particulate composition essentially comprising:
    (a) free-flowing crystals of 2,2-bis(2,3-epoxypropoxyphenyl)propane and
    (b) a curing amount of an amine curing agent therefor which is a solid at temperatures up to 100° F.

2. A solid, particulate composition essentially comprising:
    (a) free-flowing crystals of 2,2-bis(2,3-epoxypropoxyphenyl)propane and
    (b) a curing amount of metaphenylene diamine.

3. A process for producing a free-flowing, solid, resinifiable composition which comprises blending in the solid state at least:
    (a) free-flowing crystals of 2,2-bis(2,3-epoxypropoxyphenyl)propane and
    (b) a curing amount of an amine curing agent therefor which is a solid at temperatures up to 100° F., and maintaining the resulting blend at a temperature below about 100° F.

4. The process according to claim 3 in which the curing agent is metaphenylene diamine.

5. A solid, particulate composition essentially comprising:
    (a) free-flowing crystals of 2,2-bis(2,3-epoxypropoxyphenyl)propane and
    (b) about 0.62 stoichiometric equivalent of metaphenylene diamine.

References Cited by the Examiner
UNITED STATES PATENTS 2,989,498 6/1961 Mackenzie et al. _____ 260—37
3,095,429 6/1963 Smith et al. _____ 260—348

OTHER REFERENCES

H. Lee and K. Neville, "Epoxy Resins," McGraw-Hill Book Co., New York, 1957. Pages 146–152 relied upon.

MORRIS LIEBMAN, *Primary Examiner.*

J. E. CALLAGHAN, *Assistant Examiner.*